US008756689B2

(12) United States Patent
Jani et al.

(10) Patent No.: US 8,756,689 B2
(45) Date of Patent: Jun. 17, 2014

(54) METHOD, SYSTEM, AND DEVICE FOR SECURELY HANDLING VIRTUAL FUNCTION DRIVER COMMUNICATIONS WITH A PHYSICAL FUNCTION DRIVER

(75) Inventors: Nrupal R. Jani, Hillsboro, OR (US); Shannon L. Nelson, Portland, OR (US); Gregory D. Cummings, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/538,132

(22) Filed: Jun. 29, 2012

(65) Prior Publication Data

US 2014/0007230 A1   Jan. 2, 2014

(51) Int. Cl.
  *G06F 21/00* (2013.01)
(52) U.S. Cl.
  USPC ...... 726/22; 726/1; 726/16; 726/24; 713/100; 713/153; 713/182
(58) Field of Classification Search
  USPC .......................................................... 726/22
  See application file for complete search history.

(56) References Cited

U.S. PATENT DOCUMENTS

| 8,601,386 | B2 * | 12/2013 | Altberg et al. ................. 715/771 |
| 2007/0106986 | A1 | 5/2007 | Worley |
| 2011/0145886 | A1 * | 6/2011 | Mckenzie et al. ................. 726/1 |
| 2011/0239213 | A1 | 9/2011 | Aswani et al. |
| 2011/0289578 | A1 * | 11/2011 | Bugenhagen et al. .......... 726/11 |
| 2011/0314468 | A1 | 12/2011 | Zhou et al. |
| 2011/0321166 | A1 | 12/2011 | Capalik et al. |
| 2012/0066541 | A1 * | 3/2012 | Dournov et al. ................. 714/3 |

FOREIGN PATENT DOCUMENTS

| KR | 1020110139130 A | 12/2011 |
| WO | 2009070666 A1 | 6/2009 |
| WO | 2009097610 A1 | 8/2009 |
| WO | 2014004406 A1 | 1/2014 |

OTHER PUBLICATIONS

"System-Level Performance Analysis for Designing On-Chip Communication Architectures"; Lahiri et al; IEEE Transactions on Computer-Aided Design of Integrated Circuits and Systems, vol. 20, No. 6, Jun. 2001.*
"PCI-SIG SR-IOV/Primer, an Introduction to SR-IOV Technology," Intel LAN Access Division, Jan. 2011, 28 pages.
International Search Report and Written Opinion received for International Application No. PCT/US2013/047424, mailed on Sep. 27, 2013, 14 pages.

* cited by examiner

*Primary Examiner* — Jason Lee
(74) *Attorney, Agent, or Firm* — Barnes & Thornburg, LLP (57) ABSTRACT

In an input/output virtualization-enabled computing environment, a device, method, and system for securely handling virtual function driver communications with a physical function driver of a computing device includes maintaining communication profiles for virtual function drivers and applying the communication profiles to communications from the virtual function drivers to the physical function driver, to determine whether the communications present a security and/or performance condition. The device, method and system may disable a virtual function driver if a security and/or performance condition is detected.

26 Claims, 3 Drawing Sheets

METHOD, SYSTEM, AND DEVICE FOR SECURELY HANDLING VIRTUAL FUNCTION DRIVER COMMUNICATIONS WITH A PHYSICAL FUNCTION DRIVER

BACKGROUND

Virtualization refers to the use of computer software (e.g., "virtual machines" or "system images") to emulate or otherwise implement the functions or features of a physical computing device, typically so that the physical computing resources can be shared. For example, multiple virtual machines (VMs) can run concurrently on the same physical computing system. In the context of input-output (I/O) devices, virtualization technologies can be used to allow multiple virtual machines to share the same I/O hardware resources.

"Cloud" computing often refers to the provision of computing resources as a service, usually by a number of computer servers that are networked together at location(s) that are remote from the location from which the services are requested. A cloud server or portions of its resources may be allocated using virtualization. In a cloud environment, multiple system images (SIs) may be executing on disparate processing components of independent networked servers.

Virtualized environments, such as VMs and system images (SIs), can be corrupted with malicious software or be otherwise compromised from a security or performance standpoint. As the number of VMs or SIs increases, the risk of security breaches, denial of service (DOS) attacks, and other security- and/or performance-related problems may increase as well.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits and full software instruction sequences have not been shown in detail in order not to obscure the description of the of the concepts described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computer system may include one or more point-to-point or bus-based interconnects between components. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

In some I/O virtualization technologies, the physical resources of an I/O device can be shared using virtual functions (VFs) that map to the physical functions (PFs) of the I/O device. One example of such a physical "function" is an individual communications port of an I/O device (e.g., an Ethernet port). Each VF and PF in a virtualized I/O system has an associated device driver, e.g., system software that enables applications software to communicate with or implement the function. For example, in some embodiments (e.g., Peripheral Component Interconnect (PCI) and/or PCI Express devices), each VF driver can support a unique and/or separate data path for I/O related functions. This can allow the bandwidth of a single I/O port to be partitioned into smaller "slices" that may be allocated to specific VMs, SIs, or "guests." For ease of discussion, the term "VM" is used herein but is intended as shorthand to refer to VMs, SIs, guests or other types of processes or mechanisms that implement a virtualized computing environment, whether in a single-root or multiple-root configuration. The sharing of I/O resources through virtualization can increase the total utilization of the I/O device and thereby reduce the cost of a virtual system.

I/O virtualization-enabled devices can be configured to support multiple VFs, so that each physical function of the I/O device can appear as multiple separate physical devices. The VFs are each assigned to a VM by software that may be referred to as a virtual machine manager (VMM) or hypervisor. In some embodiments, multiple VFs can be assigned to each VM. A physical function driver (PF driver) manages the physical functions of the I/O virtualization-capable device and responds to requests for resources that it receives from the multiple virtual function drivers (VF drivers).

The Peripheral Component Interconnect (PCI) Special Interest Group has developed specifications to address the sharing of I/O devices in a standard way. One such specification is the Single-Root I/O Virtualization (SR-IOV) Specification. Some versions of the SR-IOV Specification describe a mechanism by which VF drivers can communicate directly with the I/O hardware in limited circumstances, but must go through the PF driver for any communication that would have an effect beyond the VF driver's specific VM. As such, if a VF driver or its associated VM is compromised (e.g., from a security and/or performance standpoint), communications it sends to the PF driver could affect the entire virtualized I/O device.

Figure 1:
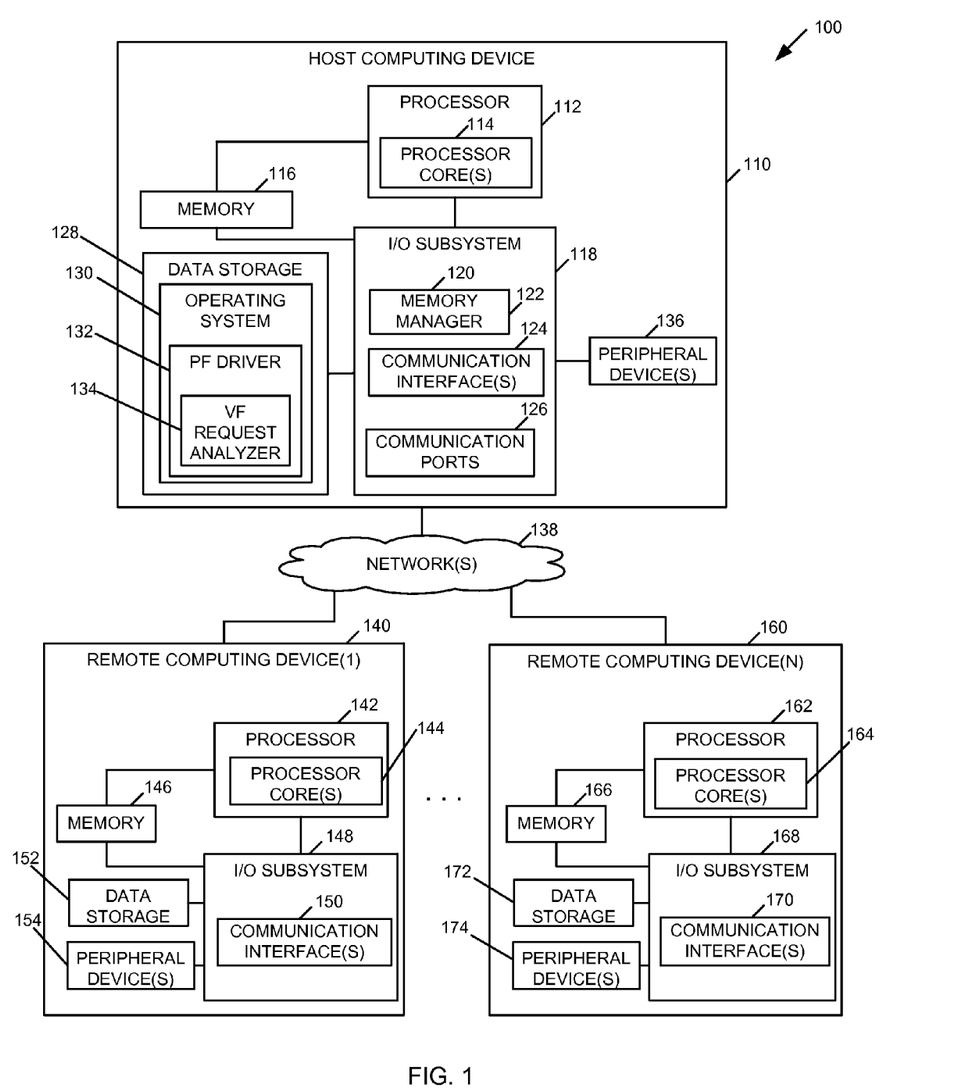
FIG. 1 is a simplified block diagram of at least one embodiment of a system for handling virtual function driver communications at a virtualized computing device.

Referring now to FIG. 1, an illustrative system 100 for detecting security and/or performance-compromised VF drivers is embodied in a PF driver 132 of a host computing device 110. As explained in further detail below, the PF driver 132 includes a VF request analyzer 134, which monitors communications received by the PF driver 132 from the various VF drivers in the virtualized system. The VF request analyzer 134 maintains a profile for each VM, which includes security and/or performance-related attributes for each VF driver running in the VM. When the PF driver 132 receives a communication from a particular VF driver, the VF request analyzer 134 uses the associated VM profile to determine whether the communication is valid. The VF request analyzer 134 monitors the number of valid and/or invalid communications issued by particular VF drivers over time to determine whether the VF drivers may be compromised. If the VF request analyzer 134 determines that a particular VF driver may be compromised, it can disable the VF driver without affecting other aspects of the virtualized system. By identifying and tracking suspicious VF driver communications, the system 100 can isolate the effect of the suspicious VF driver in its associated VM and prevent the suspicious VF driver from adversely affecting the larger virtualized I/O system.

The illustrative host computing device 110 includes at least one processor 112, memory 116, an input/output (I/O) subsystem 118, a data storage device 128, and one or more peripheral devices 136. The host computing device 110 may be embodied as any suitable type of server computer or other computing device capable of performing the functions and features described herein as being performable by the host computing device 110 or any of its components. For example, the host computing device 110 may be embodied as a computer, a personal computer (PC), a desktop computer, a laptop computer, a notebook computer, a handheld computer, a server, a server array or server farm, a web server, a network server, an enterprise server, an Internet server, a work station, a mini-computer, a main frame computer, a supercomputer, a network appliance, a web appliance, a distributed computing system, multiprocessor system, processor-based system, or combination of any of the foregoing and/or others.

The illustrative processor 112 includes at least one processor core 114 (e.g., microprocessor, microcontroller, digital signal processor, and/or others). In addition to an amount of cache memory, the processor 112 includes, or is otherwise communicatively coupled to, the memory 116. The memory 116 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The processor 112 is also communicatively coupled to the I/O subsystem 118. The illustrative I/O subsystem 118 includes a memory manager 120, one or more communication interfaces(s) 124, and one or more communication ports 126. The illustrative memory manager 120 may include a memory controller (e.g., a memory controller subsystem or northbridge). In the illustrative embodiments, the memory manager 120 includes hardware and/or firmware components that facilitate or otherwise assist in the virtualization of physical functions of the host computing device 110, and particularly, the virtualization of physical functions of the I/O subsystem 118. For example, the illustrative memory manager 120 manages and facilitates the use of virtual memory by software processes running on the host computing device 110.

The illustrative communication interfaces 124 may be embodied as network interface controllers (NICs), network cards or adapters, Ethernet controllers, and/or others. In general, the communication interfaces 124 include electronic circuitry (e.g., Ethernet, Fast Ethernet, Gigabit Ethernet, and/or others) that enables the host computing device 110 to communicate with one or more wired or wireless networks 138, to allow the host computing device 110 to communicate with one or more remote computing devices (1) . . . (N) (where N is a positive integer) 140, 160. The communication interfaces 124 may include one or more wired and/or wireless network interfaces to facilitate communications over the wired and/or wireless portions of the networks 138. The communication interfaces 124 may be integral with the motherboard of the host computing device 110, or may be embodied as expansion cards that connect to the motherboard via a bus (such as a PCI or PCI-Express connector).

The illustrative communication ports 126 include the specific input/output ports of the respective communication interfaces 124, through which communications with the networks 138 are accomplished. In the illustrative embodiments, the communication ports 126 are embodied as hardware resources that can be shared using I/O virtualization techniques.

While not specifically shown, the I/O subsystem 118 may include an input/output controller (e.g., an input/output controller subsystem or southbridge) and a firmware device. In other embodiments, I/O subsystems having other configurations may be used. For example, in some embodiments, the I/O subsystem 118 may form a portion of a system-on-a-chip (SoC) and be incorporated, along with the processor 112 and other components of the host computing device 110, on a single integrated circuit chip. As such, it will be appreciated that each component of the I/O subsystem 118 may be located on a common integrated circuit chip in some embodiments.

The I/O subsystem 118 is communicatively coupled to a data storage device 128. Portions of the data storage device 128 may be embodied as any suitable device for storing data and/or computer instructions, such as disk storage (e.g., hard disks), a network of physical and/or logical storage devices, and/or others. In the "static" computing environment shown in FIG. 1, the illustrative data storage device stores at least a portion of an operating system 130. The illustrative operating system 130 includes the PF driver 132, which includes the VF request analyzer 134. The illustrative operating system 130, PF driver 132, and VF request analyzer 134 are embodied as one or more computerized programs, logic and/or instructions (e.g., software and/or firmware functions, routines, libraries, and/or others). Portions of the operating system 130, PF driver 132, and/or VF request analyzer 134 may be copied to the memory 116 during operation, for faster processing or other reasons.

In some embodiments, the I/O subsystem 118 may be communicatively coupled to one or more peripheral device(s) 136, such as a display, touchpad, keypad, microphone, speaker, and/or others, depending upon, for example, the intended use of the host computing device 110. Further, it should be appreciated that the host computing device 110 may include other components, sub-components, and devices not illustrated in FIG. 1 for clarity of the description.

The network 138 may be embodied as any type of wired and/or wireless telecommunications network. For example, the network 138 may be embodied as or otherwise include one or more public or private cellular networks, telephone, Digital Subscriber Line (DSL) or cable networks, local or wide area networks, publicly available global networks (e.g., the Internet), or any combination thereof. For example, in some embodiments, the network 138 may be embodied as or otherwise include a Global System for Mobile Communications (GSM) cellular network. Additionally, the network 138 may include any number of additional devices as needed to facilitate communication between or among the host computing device 110 and/or the remote computing devices 140, 160, such as routers, switches, intervening computers and/or others. Any suitable communication protocol (e.g., TCP/IP) may be used to effect communication over the network 138, depending on, for example, the particular type or configuration of the network 138.

The remote computing devices 140, 160 may be embodied as any suitable type of computer or other electronic device. For example, each or any of the remote computing devices 140, 160 may be embodied as any of the types of computing devices mentioned above in the description of the host computing device 110 and/or others. In general, the remote computing devices 140, 160 include hardware components (e.g., processor, memory, I/O subsystem, data storage, communication circuitry) similar or analogous to those described above in connection with the host computing device 110. The illustrative remote computing devices 140, 160 each include at least one processor 142, 162. The illustrative processors 142, 162 include at least one processor core 144, 164. In addition to an amount of cache memory, the processors 142, 162 each include, or are otherwise communicatively coupled to, memory 146, 166. The processors 142, 162 are also communicatively coupled, respectively, to an I/O subsystem 148, 168. The illustrative I/O subsystems 148, 168 each include communication interfaces 150, 170, and are communicatively coupled to a data storage device 152, 172. In some embodiments, the I/O subsystems 148, 168 may be communicatively coupled to one or more peripheral devices 154, 174.

In general, the respective components of the host computing device 110 and the remote computing devices 140, 160 are communicatively coupled as shown in FIG. 1, by one or more signal paths. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like. Also, generally speaking, some of the components of the computing devices described above may be incorporated on a motherboard while other components may be communicatively coupled to the motherboard via, for example, a peripheral port.

Figure 2:
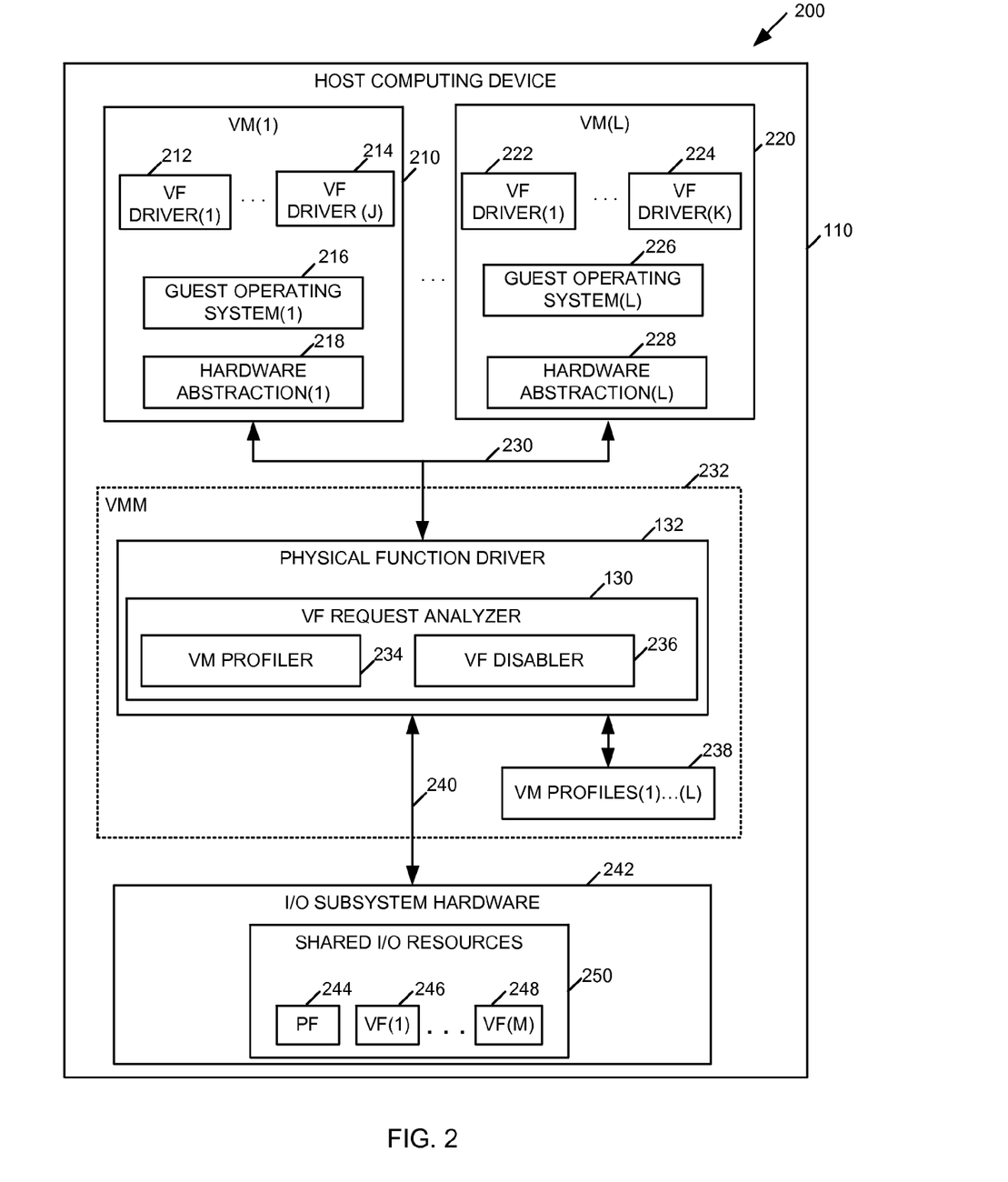
FIG. 2 is a simplified block diagram of at least one embodiment of a virtualized execution environment of the computing device of FIG. 1.

Referring now to FIG. 2, an illustrative virtualized software execution environment 200 is established on the host computing device 110 to implement I/O virtualization. The software execution environment 200 includes a virtual machine monitor (VMM) or hypervisor 232, which is a privileged software component that facilitates and manages the virtualization of the I/O subsystem hardware 242 (e.g., communication ports 126 or other physical resources of the communication interfaces 124), and may additionally facilitate and manage the virtualization of other physical resources of the host computing device 110 (e.g., memory and/or processor resources). In the illustrative single-root embodiment, the VMM or hypervisor 232 allows multiple guest operating systems (1) . . . (L) (where L is a positive integer) 216, 226 and/or other guest applications to execute concurrently or serially on the host computing device 110 in separate virtual machines VM (1) . . . (L). In multiple-root embodiments, the VMM or hypervisor 232 allows and manages multiple guests (e.g., SIs) executing concurrently or serially on disparate computing resources (e.g., multiple servers). In the illustrative embodiments, the VMM or hypervisor 232 is executed by the operating system 130 in a higher-privileged or "root"

mode of the host computing device 110. As such, the VMM or hypervisor 232 and its subcomponents (e.g., the PF driver 132 and/or any of its sub-modules) may have substantially full control of the I/O subsystem hardware resources 242 and/or other hardware resources of the host computing device 110.

The virtual machines 210, 220 execute as guests on the VMM 232. That is, the VMs 210, 220 are executed by the VMM 232 in a lower-privileged, non-privileged, or non-root mode. Thus, the guest operating systems 216, 226 are lesser-privileged operating systems than the higher-privileged operating system 130. The operating systems executed by each of the VMs 210, 220 may be the same or different. In some embodiments, any one or more of the operating systems 130, 216, 226 may be embodied as a WINDOWS operating system, commercially available from Microsoft Corporation of Redmond, Wash., a LINUX operating system, which is commercially available from a number of vendors such as Red Hat of Raleigh, N.C., and/or others.

Each of the operating systems 216, 226 may execute a number (J, K) of virtual function (VF) drivers 212, 214, 222, 224, and each or any of the VF drivers 212, 214, 222, 224 may be similar or different based on the respective operating system 216, 226, the intended use of the respective VM 210, 220, and/or other criteria.

The VMM 232 translates operations of each operating system 216, 226 to provide a level of abstraction between each operating system 216, 226 and the I/O subsystem hardware 242 and/or other hardware of the host computing device 110 (e.g., memory, processors, etc.). In the illustrative embodiments, the VMM 232 provides a hardware abstraction 218, 228, of some or all of the hardware components of the host computing device 110 for each operating system 216, 226.

With regard to I/O virtualization, the illustrative VMM 232 provides hardware abstractions of or "virtualizes" the physical I/O device functions 244 (e.g., Ethernet ports) as shared I/O resources 250. In some embodiments, the I/O device functions can be abstracted into two function types: physical functions (PFs) and virtual functions (VFs), which may be configured in accordance with an SR-IOV specification. For instance, PFs may be full network communication (e.g., PCI-Express) functions that include certain extended capabilities to configure and manage the I/O virtualization functionality, while VFs may be 'lightweight' or more limited network communication functions that contain the necessary resources for data transfer but have a minimized set of configuration resources. As noted above, the PF 244 has a corresponding PF driver 132 and each VF (1) . . . (M) 246, 248, has a corresponding VF driver 212, 214, 222, 224. The VF drivers 212, 214, 222, 224 enable communication between the respective VM 210, 220 and the PF driver 132 (e.g., the sending and receiving of data).

One or more of the VFs 246, 248 are assigned to each VM 210, 220 by the VMM 232, with the involvement of the PF driver 132 (which may also be referred to as a "Master Driver"). A configuration manager of or associated with the VMM 232 configures and manages the VFs 246, 248 and their associated memory resources. The VMM 232 also enables communication between the VF drivers 212, 214, 222, 224 and the PF driver 132 (e.g., using shared virtual memory pages). The one or more communication channels 230 that enable the VF drivers 212, 214, 222, 224 to communicate with the PF driver 132 can be hardware and/or software communication channels. For example, in some embodiments, the communication channel(s) 230 may include a PCI-Express device and/or a software-based address translation technology.

The illustrative PF driver 132 manages global functions for the I/O subsystem hardware 242 and configures the shared resources 250. The PF driver 132 executes in the VMM 232 and thus operates in a more privileged environment than the VF drivers 212, 214, 222, 224 operate. The PF driver 132 gives the VMM 232 access to the shared I/O resources 250 and can perform operations that affect the entire I/O device. Thus, the PF driver 132 executes in a persistent environment, being loaded before any VF drivers and unloaded after all of the VF drivers have been unloaded.

The illustrative virtualized I/O environment is configured so that VF driver communications that globally affect all of the VMs 210, 220 should have to go through the PF driver 132, while lower-risk operations may be communicated directly from the VF drivers 212, 214, 222, 224 to the I/O subsystem hardware 242. Communication between the I/O subsystem hardware 242 and the virtualized I/O environment occurs over one or more communication channels 240, which, in the illustrative embodiments, are hardware communication channels.

As mentioned above, the PF driver 132 includes a VF request analyzer sub-module 134. In turn, the illustrative VF request analyzer sub-module 134 includes a VM profiler sub-module 234 and a VF disabler sub-module 236. The illustrative VF request analyzer 134, VM profiler 234, and VF disabler 236 are embodied as computerized modules, routines, processes, or the like (e.g., software). As described further below with reference to FIG. 3, the VM profiler 234 creates and maintains a profile 238 for each VM 210, 220, which includes security and/or performance attributes associated with each VF driver 212, 214, 222, 224 running in the respective VM 210, 220. In operation, as the PF driver 132 receives communications (e.g., requests for shared I/O resources 250) from the various VF drivers 212, 214, 222, 224, the VF request analyzer 134 analyzes the communications based on the corresponding attributes of the VM profiles 238 and determines whether the communications are valid or invalid in view of the profile attributes. If the VF request analyzer 134 determines, e.g., based on the number, frequency, or combination of valid or invalid communications, that a VF driver 212, 214, 222, 224 may be compromised, e.g., from a security and/or performance standpoint, the VF disabler 236 can disable the compromised VF driver 212, 214, 222, 224.

The illustrative VM profiles 238 are implemented as one or more data stores that are accessible to the VF request analyzer 134 in the virtualized environment 200. For instance, in some embodiments, the VM profiles 238 are embodied as software data structures comprising arrays of integers, where each integer in the array corresponds to a permitted number of communications of a certain type that the PF driver 132 can receive from a particular VM or VF driver. The profiles 238 can be initially set by a system administrator (e.g., using a configuration tool such as ethtool) or a "default" profile 238 can be provided by the software designer and later modified by a system administrator or by the PF driver 132. Alternatively or in addition, the VM profiles 238 can be modified dynamically at runtime by the PF driver 132. For example, the VM profile 238 for a particular VM may be modified at runtime if the VF request analyzer 134 notices a certain pattern of communications coming from the VM over time.

In some embodiments, the attributes associated with the VM profiles 238 specify limits associated with different request types. In many cases, the communications from the VF drivers 212, 214, 222, 224 are requests to access or use one or more of the shared I/O resources 250. Different types of communications may have different pre-specified formats, and the VF request analyzer 134 can be configured to determine whether a communication is valid based on whether it conforms to an expected format. Some illustrative examples of types of communication messages that a PF driver may receive from a VF driver include: a request for access to a virtual communication channel (or other resource), a request for the PF driver to add one or more unicast or multicast address filters for a specified communication port (e.g., Virtual Station Interface or VSI), a request for the PF driver to remove one or more unicast or multicast filters for a specified communication port (e.g., VSI), a request for the PF driver to add one or more virtual local area network (VLAN) tag filters for a specified communication port (e.g., VSI), and a request for the PF driver to remove one or more VLAN tag filters for a specified communication port (e.g., VSI), and/or others.

Some illustrative examples of attribute types that may be contained in a VM profile 238 include: a limit on the number of hardware resource requests (total and/or over a period of time), an access control list (e.g., a list of message types that the VM or VF driver is permitted to send to the PF driver, stored in computer memory), a message rate limit (e.g., a maximum number of messages that a VM or VF driver can send to the PF driver over a period of time), a limit on the number of "unprivileged" messages a VM or VF driver can send to the PF driver (total and/or over a period of time) (where "unprivileged" may indicate that a particular message or message type is not on the access control list), a limit on the number of valid but "malformed" messages a VM or VF driver can send to the PF driver (total and/or over a period of time) (where "malformed" means that a message does not conform to an expected message format), a limit on the number of requests that are valid but request access to an unallocated resource, and a list of filters (e.g., Media Access Control or MAC filters, VLAN filters, and/or others) that a particular VM or VF driver is permitted to request be added or removed by the PF driver. Other types of attributes that may be included in a VM profile 238 include limits on particular combinations of communication types, limits on the total number of communications (valid or invalid), and limits on the total number of valid communications that a VM or VF driver can send to a PF driver (total and/or over a period of time). Attributes can be defined for all of the VF drivers in a given VM, or separately for each VF driver in a VM. Alternatively, attributes can be defined the same way for all VMs or differently for different VMs.

Figure 3:
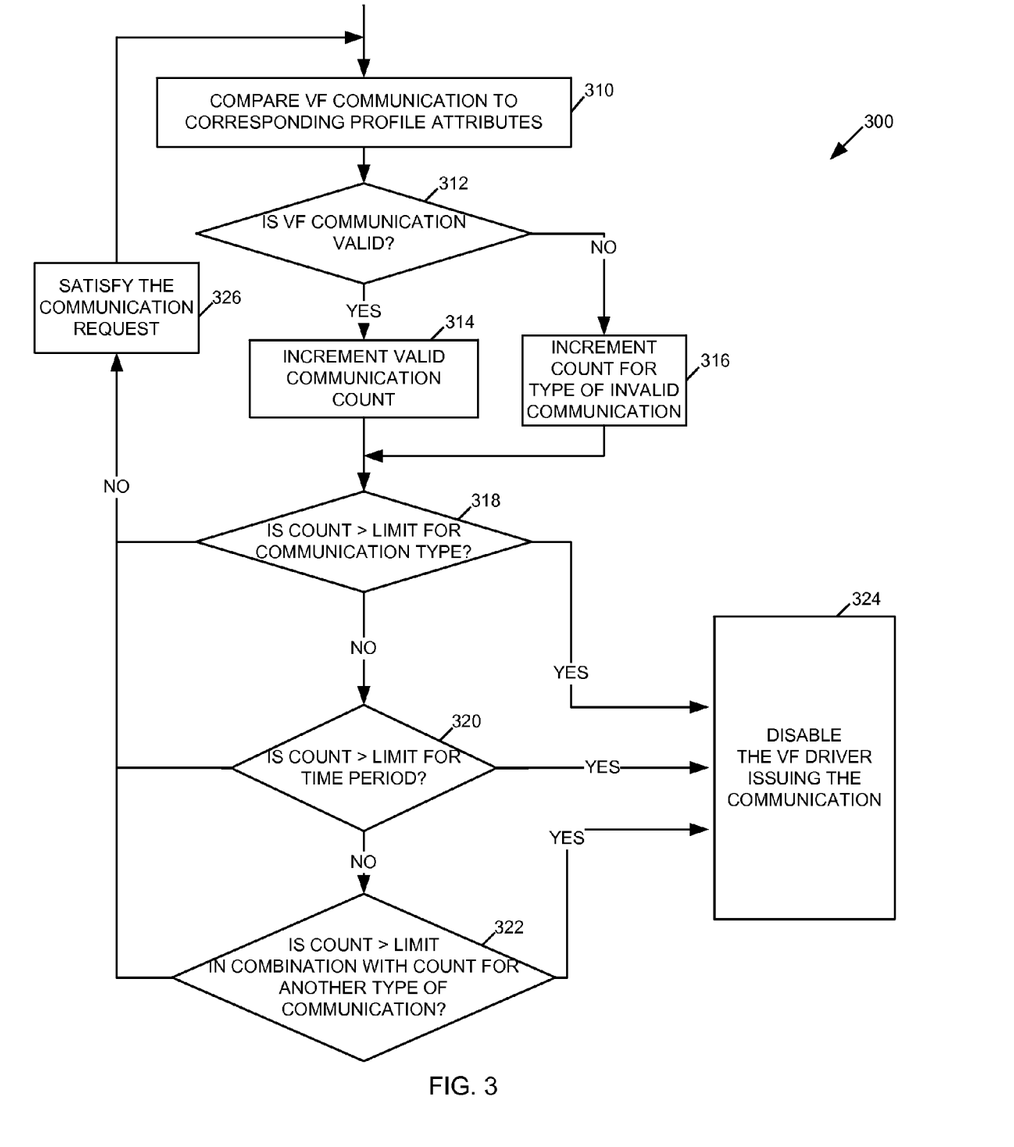
FIG. 3 is a simplified flow diagram of at least one embodiment of a method for analyzing communications from virtual function drivers and determining whether to disable a virtual function driver in the system of FIG. 1.

Referring now to FIG. 3, an illustrative method 300 executable as computerized logic and/or instructions by the various modules of the VF request analyzer 134 is shown. At block 310, the method 300 analyzes an incoming communication (e.g., a data packet and/or request for access or use of a shared resource 250) from a VF driver 212, 214, 222, 224, determines the communication type (e.g., type of request) and compares the communication to the relevant attributes of the corresponding VM profile 238.

At block 312, the method 300 determines whether the incoming communication is valid based on the limits specified for the particular communication type. For example, if the message format does not correspond to the expected format, or if the message type is not on the applicable access control list, or the message requests an unallocated resource or unpermitted filter, the communication may be determined to be valid as long as the number of such requests does not exceed a predetermined limit, or the communication may be determined to be invalid.

If the communication is determined to be valid, then at block 314, a count of the number of valid communications is incremented. Similarly, if the communication is determined to be invalid, then a count of the number of invalid messages of the particular message type is incremented at block 316. In other words, counts of invalid messages can be maintained separately for different types of invalid messages. At the exemplary blocks 318, 320, and 322, the method 300 executes a variety of tests to determine whether the VF driver issuing the communication is potentially compromised (e.g., from a security and/or performance standpoint) and therefore should be disabled. At block 318, the method 300 determines whether the count exceeds the limit specified in the corresponding VM profile 238 for the particular communication type. For example, if the communication is determined at block 312 to be a malformed request, the count of malformed requests is incremented at block 316, and at block 318, the current value of the malformed requests count is compared to the malformed requests limit (or, maximum number of malformed requests).

If the current value of the count for the communication type exceeds the specified limit, then the method proceeds to block 324. If the current value of the count for the communication type does not exceed the specified limit at block 318, then at block 320 the method 300 determines whether the count exceeds a specified limit for a specified time period. In other words, block 320 evaluates whether the rate at which the PF driver receives communications from a VF driver is too high (e.g., to potentially ward off a denial of service attack). If the communication rate exceeds the specified limit, the method proceeds to block 324. If the communication rate does not exceed the specified limit at block 320, then at block 322 the method determines whether the combination of different communication types that have been received by the PF driver from a VF driver indicates that the VF driver may be compromised (e.g., based on the current value of the count of one or more other communication types in combination with the count of the currently received communication type). It should be appreciated by those skilled in the art that the tests illustrated by blocks 318, 320, 322 are exemplary and other tests may similarly be conducted by the method 300 to determine whether to disable a VF driver. Moreover, it should be appreciated that the specific order in which blocks 318, 320, 322 are displayed is illustrative and not necessarily required by all embodiments. Rather, the tests conducted by the method 300 to determine whether a particular VM or VF driver may be comprised may be performed in any suitable order, according to the requirements of a particular design or implementation of the method 300.

At block 324, the method 300 disables the VF driver that has been determined to be potentially (or actually) compromised as a result of block 318, 320, or 322 (or any combination thereof, or other tests, in other embodiments). To disable the VF driver, the method 300 (or more particularly, the PF driver 132) reconfigures the compromised VF driver so that it cannot interact with the network(s) 138 or with the I/O subsystem hardware 242 without the PF driver re-enabling its access. When disabled, a compromised VF driver is unable to send any communications to the PF driver 132 and therefore cannot affect the I/O operations of other VMs and VF drivers. If, however, the communication does not satisfy any of the conditions for disabling the transmitting VF driver, then at block 326 the method 300 satisfies the communication request issued by the VF driver. To satisfy the VF driver's request, the PF driver 132 allocates the shared resource 250 requested by the VF driver in the analyzed communication.

EXAMPLES

Illustrative examples of the devices, systems, and methods disclosed herein are provided below. An embodiment of the devices, systems, and methods may include any one or more, and any combination of, the examples described below.

In an example, an input/output virtualization-enabled computing device includes a request analyzer to determine whether communications from a plurality of virtual function drivers present a security and/or performance condition and determine whether to disable a virtual function driver based on a counted number of communications from the virtual function driver that are determined to present the security and/or performance condition. In an example, the computing device may include a virtual function profiler to maintain at least one communication profile comprising data relating to communications from the virtual function drivers to a physical function driver of the virtualization-enabled computing device. In an example, the communication profile may identify one or more types of communications that a virtual function driver is permitted to send to the physical function driver. In an example, the communication profile may include at least one limit relating to a type of communication that the virtual function driver may send to the physical function driver. In an example, the communication profile may include a limit relating to the number of communications of any type that a virtual function driver is permitted to send to the physical function driver over a period of time. In an example, the communication profile may include data relating to one or more requests for physical resources that a virtual function driver is permitted to send to the physical function driver. In an example, the computing device may include at least one computer-accessible storage medium, and the virtual function profiler may be embodied as a software module in the at least one computer accessible storage medium. In an example, the computing device may include a virtual function disabler to disable a virtual function driver in response to determining that a counted number of communications from the virtual function driver present the security and/or performance condition. In an example, the virtual function disabler may determine whether a counted number of communications that present the security and/or performance condition received by the physical function driver from a virtual function driver exceeds a permitted number of communications that present the security and/or performance condition. In an example, the virtual function disabler may disable the virtual function driver in response to determining that the counted number of communications that present the security and/or performance condition received by the physical function driver exceeds the permitted number of communications that present the security and/or performance condition. In an example, the computing device may include at least one computer-accessible storage medium and the virtual function disabler may be embodied as a software module in the at least one computer accessible storage medium.

In an example, the computing device may include at least one computer-accessible storage medium and the physical function driver may be embodied as a software module in the at least one computer accessible storage medium. In an example, the computing device may include a virtual function profiler to maintain profiles of virtual function drivers and virtual function disabler to disable virtual function drivers based on the profiles, and the virtual function profiler and the virtual function disabler may be embodied as software submodules of the physical function driver. In an example, the request analyzer may run in a higher-privileged execution environment of the computing device and the virtual function drivers each run in a lower-privileged environment of the computing device. In an example, the computing device may include a communications channel to receive communications from the virtual function drivers, and the communications channel may include at least one of a software communications channel and a hardware communications channel.

In another example, a method for handling communications from a plurality of virtual function drivers to a physical function driver of a input/output virtualization-enabled computing device includes, at the computing device, maintaining a plurality of communication profiles, each communication profile comprising data relating to communications of a virtual function driver with the physical function driver; determining whether a communication from a virtual function driver to the physical function driver presents a security and/or performance condition based on at least a portion of a communication profile corresponding to the virtual function driver; counting communications from the virtual function driver to the physical function driver; and determining whether to disable the virtual function driver based on the counted communications from the virtual function driver to the physical function driver.

In an example, the method may include counting communications from the virtual function driver to the physical function driver that present the security and/or performance condition. In an example, the method may include determining whether to disable the virtual function driver based on the counted communications that present the security and/or performance condition. In an example, at least one of the communication profiles may include data relating to a permitted number of malformed communications. In an example, at least one of the communication profiles may include data relating to whether a communication is listed on an access control list. In an example, at least one of the communication profiles may include data relating to whether a communication requests access to an unallocated resource of the computing device. In an example, at least one of the communication profiles may include data relating to a filter permitted to be set by a communication.

In an example, the method may include disabling a virtual function driver based on a number of communications of a certain type sent from the virtual function driver to the physical function driver. In an example, the method may include counting communications of a first type from a virtual function driver to the physical function driver, counting communications of a second type from the virtual function driver to the physical function driver, and determining whether to disable the virtual function driver based on the counted communications of the first type and the counted communications of the second type. In an example, the method may include counting permitted communications from the virtual function driver to the physical function driver and determining whether to disable the virtual function driver based on the counted permitted communications from the virtual function driver to the physical function driver. In an example, a computing device may include at least one processor and computer circuitry coupled to the at least one processor, and the computer circuitry may be arranged to cause the at least one processor to perform any of the foregoing methods. In an example, at least one computer accessible storage medium may include a plurality of instructions that in response to being executed result in a computing device performing any of the foregoing methods.

In an example, at least one computer accessible storage medium includes a plurality of instructions that in response to being executed result in a computing device maintaining a plurality of communication profiles, where each communication profile includes data relating to communications of a virtual function driver with the physical function driver; determining whether a communication from a virtual function driver to the physical function driver presents a security and/or performance condition based on at least a portion of a communication profile corresponding to the virtual function driver; counting communications from the virtual function driver to the physical function driver; and determining whether to disable the virtual function driver based on the counted number of communications from the virtual function driver to the physical function driver.

In an example, one or more of the communication profiles may include data relating to at least one of: a permitted number of malformed communications, whether a communication is listed on an access control list, whether a communication requests access to an unallocated resource of the computing device, and a filter permitted to be set by a communication. In an example, the instructions may result in the computing device disabling a virtual function driver based on counted communications of a certain type sent from the virtual function driver to the physical function driver. In an example, the instructions may result in the computing device counting communications of a first type from a virtual function driver to the physical function driver, counting communications of a second type from the virtual function driver to the physical function driver, and determining whether to disable the virtual function driver based on the counted communications of the first type and the counted communications of the second type. In an example, the instructions may result in the computing device counting permitted communications from the virtual function driver to the physical function driver and determining whether to disable the virtual function driver based on the counted permitted communications from the virtual function driver to the physical function driver.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, aspects of the present disclosure may be implemented in the context of the SR-IOV Specification or other similar specifications, but are not limited thereby. Rather, aspects of the present disclosure may be applied in any I/O virtualization context (including single- and multi-root environments) in which it is desired to protect the larger virtualized environment from compromised individual components thereof.

The invention claimed is:

1. An input/output virtualization-enabled computing device for managing communications of virtual machines with a virtualized input/output hardware device of the computing device, the computing device comprising, embodied in one or more non-transitory machine accessible storage media of the computing device:
   a physical function driver to manage functions that globally affect the virtualized input/output hardware device of the computing device;
   a plurality of virtual function drivers each associated with a virtual machine, the virtual function drivers to send communications that globally affect the use of the virtualized input/output hardware device by the virtual machines to the physical function driver and to send communications that do not globally affect the use of the virtualized input/output hardware device directly to the virtualized input/output hardware device;
   a request analyzer to, by the physical function driver, determine whether the communications from the plurality of virtual function drivers to the physical function driver present one or more of a security condition and a performance condition and determine whether to disable a virtual function driver based on at least one communication from the virtual function driver to the physical function driver that is determined to present the one or more of the security condition and the performance condition; and
   a virtual function profiler to, by the physical function driver, maintain, over time, at least one communication profile comprising data relating to a plurality of different types of communications from the virtual function drivers to the physical function driver, wherein the communication profile is embodied in the one or more non-transitory computer accessible storage media of the computing device, and wherein the physical function driver is to track a number of communications from the virtual function driver to the physical function driver.

2. The computing device of claim 1, wherein the communication profile identifies one or more types of communications that the virtual function driver is permitted to send to the physical function driver.

3. The computing device of claim 1, wherein the communication profile comprises at least one limit relating to a type of communication that the virtual function driver sends to the physical function driver.

4. The computing device of claim 1, wherein the communication profile comprises a limit relating to a number of communications of any type that a virtual function driver is permitted to send to the physical function driver over a period of time.

5. The computing device of claim 1, wherein the communication profile comprises data relating to one or more requests for physical resources that a virtual function driver is permitted to send to the physical function driver.

6. The computing device of claim 1, comprising, embodied in one or more non-transitory computer-accessible storage media of the computing device, a virtual function disabler to disable a virtual function driver in response to determining that at least one communication from the virtual function driver presents the security and/or performance condition.

7. The computing device of claim 6, wherein the virtual function disabler determines whether at least one communication that presents the one or more of the security condition and the performance condition received by the physical function driver from a virtual function driver exceeds a permitted number of communications that present the security performance condition.

8. The computing device of claim 7, wherein the virtual function disabler disables the virtual function driver in response to determining that the determined number of communications that present the one or more of the security condition and the performance condition received by the physical function driver exceeds the permitted number of communications that present the security and/or performance condition.

9. The computing device of claim 1, comprising, embodied in the one or more non-transitory computer-accessible storage media of the computing device: a virtual function profiler to maintain profiles of virtual function drivers, and a virtual function disabler to disable virtual function drivers based on the profiles.

10. The computing device of claim 1, wherein the request analyzer runs in a higher-privileged execution environment of the computing device and the virtual function drivers each run in a lower-privileged environment of the computing device.

11. The computing device of claim 1, comprising a communications channel to receive communications from the virtual function drivers, wherein the communications channel comprises at least one of a software communications channel and a hardware communications channel.

12. A method for handling communications from a plurality of virtual function drivers to a physical function driver of a input/output virtualization-enabled computing device, wherein the physical function driver manages a physical function of input/output hardware of the computing device and the communications from the virtual function drivers to the physical function driver comprise requests by the virtual function drivers to access the physical function of the input/output hardware of the computing device that is managed by the physical function driver, the method comprising, at the computing device:
   maintaining, over time, in a data store accessible by the physical function driver, a plurality of communication profiles, each communication profile comprising data relating to a plurality of different types of communications from the virtual function driver to the physical function driver;
   determining whether a communication from a virtual function driver to the physical function driver presents one or more of: a security condition and a performance condition based on at least a portion of a communication profile corresponding to the virtual function driver by comparing the communication to the attributes of the communication profile;
   tracking a number of communications from the virtual function driver to the physical function driver; and
   determining whether to disable the virtual function driver based on the tracked number of communications from the virtual function driver to the physical function driver.

13. The method of claim 12, comprising counting communications from the virtual function driver to the physical function driver that present the one or more of the security condition and the performance condition.

14. The method of claim 13, comprising determining whether to disable the virtual function driver based on the counted number of communications that present the one or more of the security condition and the performance condition.

15. The method of claim 12, wherein at least one of the communication profiles comprises data relating to a permitted number of malformed communications.

16. The method of claim 15, wherein at least one of the communication profiles comprises data relating to whether a communication is listed on an access control list.

17. The method of claim 16, wherein at least one of the communication profiles comprises data relating to whether a communication requests access to an unallocated resource of the computing device.

18. The method of claim 17, wherein at least one of the communication profiles comprises data relating to a filter permitted to be set by a communication.

19. The method of claim 12, comprising disabling a virtual function driver based on a number of communications of a certain type sent from the virtual function driver to the physical function driver, wherein the communications comprise at least one of: valid communications and invalid communications.

20. The method of claim 12, comprising counting communications of a first type from a virtual function driver to the physical function driver, counting communications of a second type from the virtual function driver to the physical function driver, and determining whether to disable the virtual function driver based on the counted communications of the first type and the counted communications of the second type.

21. The method of claim 12, comprising counting permitted communications from the virtual function driver to the physical function driver and determining whether to disable the virtual function driver based on the number of permitted communications from the virtual function driver to the physical function driver.

22. At least one non-transitory computer accessible storage medium comprising a plurality of instructions that in response to being executed result in a computing device:
   maintaining over time, by a physical function driver of the computing device, a plurality of communication profiles, each communication profile comprising data relating to a plurality of different types of communications from a virtual function driver to the physical function driver of the computing device, wherein the communication profile is embodied in the at least one non-transitory computer accessible storage medium;
   determining, by the physical function driver of the computing device, whether a communication from a virtual function driver to the physical function driver presents one or more of: a security condition and a performance condition based on at least a portion of a communication profile corresponding to the virtual function driver;
   tracking, by the physical function driver of the computing device, communications from the virtual function driver to the physical function driver; and
   determining, by the physical function driver of the computing device, whether to disable the virtual function driver based on the tracked number of communications from the virtual function driver to the physical function driver, wherein the physical function driver is to manage a physical function of input/output hardware of the computing device and the communication from the virtual function driver to the physical function driver comprises a request to access the physical function of the input/output hardware of the computing device that is managed by the physical function driver.

23. The at least one computer accessible storage medium of claim 22, wherein at least one of the communication profiles comprises data relating to at least one of: a permitted number of malformed communications, whether a communication is listed on an access control list, whether a communication requests access to an unallocated resource of the computing device, and a filter permitted to be set by a communication.

24. The at least one computer accessible storage medium of claim 22, comprising disabling a virtual function driver based on counted communications of a certain type sent from the virtual function driver to the physical function driver, wherein the counted communications comprise at least one of: valid communications and invalid communications.

25. The at least one computer accessible storage medium of claim 22, comprising counting communications of a first type from a virtual function driver to the physical function driver, counting communications of a second type from the virtual function driver to the physical function driver, and determining whether to disable the virtual function driver based on the counted communications of the first type and the counted communications of the second type.

26. The at least one computer accessible storage medium of claim 22, comprising counting permitted communications from the virtual function driver to the physical function driver and determining whether to disable the virtual function driver based on the counted permitted communications from the virtual function driver to the physical function driver.

* * * * *